(12) United States Patent
Lee et al.

(10) Patent No.: US 8,009,531 B2
(45) Date of Patent: Aug. 30, 2011

(54) METHODS FOR OVERWITE CYCLE IMPROVEMENT OF OPTICAL STORAGE MEDIUM AND RELATED MACHINE READABLE MEDIA

(75) Inventors: Chia-Hung Lee, Taipei County (TW); Chao-Ming Huang, Taipei Hsien (TW); Jui-Hung Yen, Changhua (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 210 days.

(21) Appl. No.: 12/572,254

(22) Filed: Oct. 1, 2009

(65) Prior Publication Data
US 2011/0080813 A1 Apr. 7, 2011

(51) Int. Cl.
*G11B 20/10* (2006.01)
(52) U.S. Cl. .................. 369/47.19; 369/47.54
(58) Field of Classification Search ...... 369/47.5–47.54, 369/53.26, 53.31, 59.11
See application file for complete search history.

(56) References Cited

U.S. PATENT DOCUMENTS

| 5,144,503 | A | 9/1992 | Fukushima |
| 5,876,822 | A | 3/1999 | Zhou |
| 6,996,052 | B1 | 2/2006 | Mizuno |
| 7,376,065 | B2 | 5/2008 | Tabata |
| 7,457,225 | B2 | 11/2008 | Nagamura |
| 2002/0089907 | A1* | 7/2002 | De Kimpe et al. ............ 369/47.3 |
| 2004/0027957 | A1* | 2/2004 | Tomita ....................... 369/59.22 |
| 2004/0196762 | A1* | 10/2004 | Osakabe ...................... 369/47.5 |
| 2004/0246866 | A1* | 12/2004 | Sato et al. .................. 369/59.12 |
| 2004/0264330 | A1* | 12/2004 | Roh ........................... 369/47.53 |
| 2006/0140096 | A1 | 6/2006 | Tabata |
| 2007/0104060 | A1* | 5/2007 | Roh ........................... 369/47.53 |
| 2007/0121451 | A1* | 5/2007 | Nishimura et al. ......... 369/47.53 |
| 2007/0183285 | A1* | 8/2007 | Nishimura et al. ......... 369/47.53 |
| 2007/0189140 | A1* | 8/2007 | Nishimura et al. ......... 369/47.53 |
| 2008/0259757 | A1 | 10/2008 | Tao |

* cited by examiner

*Primary Examiner* — Thang Tran
(74) *Attorney, Agent, or Firm* — Winston Hsu; Scott Margo

(57) ABSTRACT

A method of recording data onto an optical storage medium includes: before starting recording data onto the optical storage medium from an expected link point on the optical storage medium, setting a current recording condition corresponding to the expected link point according to at least one previous recording condition corresponding to the expected link point; and controlling an operation of recording the data onto the optical storage medium according to the current recording condition.

21 Claims, 8 Drawing Sheets

(A)

(B)

| Gap field | Guard 1 | | Guard 2 | Buffer field |
|---|---|---|---|---|
| 160 + J(T) | 20 + K(bytes) | | 55 - K(bytes) | 400 - J(T) |

FIG. 5

METHODS FOR OVERWITE CYCLE IMPROVEMENT OF OPTICAL STORAGE MEDIUM AND RELATED MACHINE READABLE MEDIA

BACKGROUND

The disclosed embodiments of the present invention relate to recording data onto an optical storage medium, and more particularly, to methods for overwrite cycle improvement of an optical storage medium (e.g., a rewritable optical disc) and related machine readable media which stores instructions for performing steps of the methods.

Optical storage media, such as rewritable optical discs, have become popular data carriers nowadays. In general, old data stored on a rewritable optical disc can be overwritten by new data. Particularly, certain regions on a rewritable optical disc may be overwritten frequently. For example, direct overwrite (DOW) is frequently performed upon the recording management data (RMD) of a DVD-RW disc, the formatting disk control block (FDCB) of a DVD+RW disc, the defect management area (DMA) of a BD-RE/DVD-RAM disc, and the file structures. In general, regarding the frequently overwritten regions, old data contents before overwritten and new data contents used for overwriting may be quite similar to each other. The readability of a region where the data overwriting has been performed many times may be poor, leading to a shorter lifetime of the rewritable optical disc.

Moreover, even though the old data contents and the new data contents are different, the sector identifier (sector ID) of the same frequently overwritten region is the same. The readability of the sector ID for the region where the data overwriting may be poor, therefore affects the access of user data stored in the region identified by the sector ID.

To increase the number of available DOW cycles, a conventional solution adjusts the write power or servo parameters (e.g., a closed loop gain). However, due to the inherent variations of the optical discs/optical disc drives, the conventional solution has difficulty in keeping the number of available DOW cycles of any rewritable optical disc above an acceptable level.

SUMMARY

In accordance with embodiments of the present invention, methods for overwrite cycle improvement of an optical storage medium (e.g., a rewritable optical disc) and related machine readable media are proposed.

According to a first aspect of the present invention, an exemplary method of recording data onto an optical storage medium is disclosed. The exemplary method includes: before starting recording data onto the optical storage medium from an expected link point on the optical storage medium, setting a current recording condition corresponding to the expected link point according to at least one previous recording condition corresponding to the expected link point; and controlling an operation of recording the data onto the optical storage medium according to the current recording condition.

According to a second aspect of the present invention, an exemplary method of recording data onto an optical storage medium is disclosed. The exemplary method includes: before starting recording data onto the optical storage medium from an expected link point on the optical storage medium, generating a random number for the expected link point, and setting a recording condition corresponding to the expected link point according to the random number; and controlling an operation of recording the data onto the optical storage medium according to the recording condition.

According to a third aspect of the present invention, an exemplary method of recording data onto an optical storage medium is disclosed. The exemplary method includes: before starting recording data onto the optical storage medium from an expected link point on the optical storage medium, deriving a sequential sequence number from a predetermined sequential sequence for the expected link point, and setting a recording condition corresponding to the expected link point according to the sequential sequence number; and controlling an operation of recording the data onto the optical storage medium according to the recording condition.

Furthermore, machine readable mediums storing instructions to perform steps of above-identified exemplary methods are disclosed.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating that modulation data lengths of certain fields are not fixed.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

To increase the number of available DOW cycles of an optical storage medium (e.g., a rewritable optical disc), an exemplary embodiment of the present invention proposes a solution which aims at reducing the number of times the same content is written onto the same location on the optical storage medium. In other words, at the same link point (e.g., the same recording start address), the current and previous recording conditions should not be the same. To put it simply, an exemplary method of recording data onto an optical storage medium includes: before starting recording data onto the optical storage medium, setting a current recording condition according to at least one previous recording condition corresponding to an expected link point, and recording the data onto the optical storage medium according to the current recording condition. In one exemplary implementation, each of the current recording condition and the at least one previous recording condition includes information associated with an initial modulation data pattern (e.g., an initial eight-to-fourteen modulation pattern), a number of shift bits for a recording start address, a modulation data length adjustment, or a combination thereof. Further details directed to such an exemplary implementation are described as follows.

Figure 1:
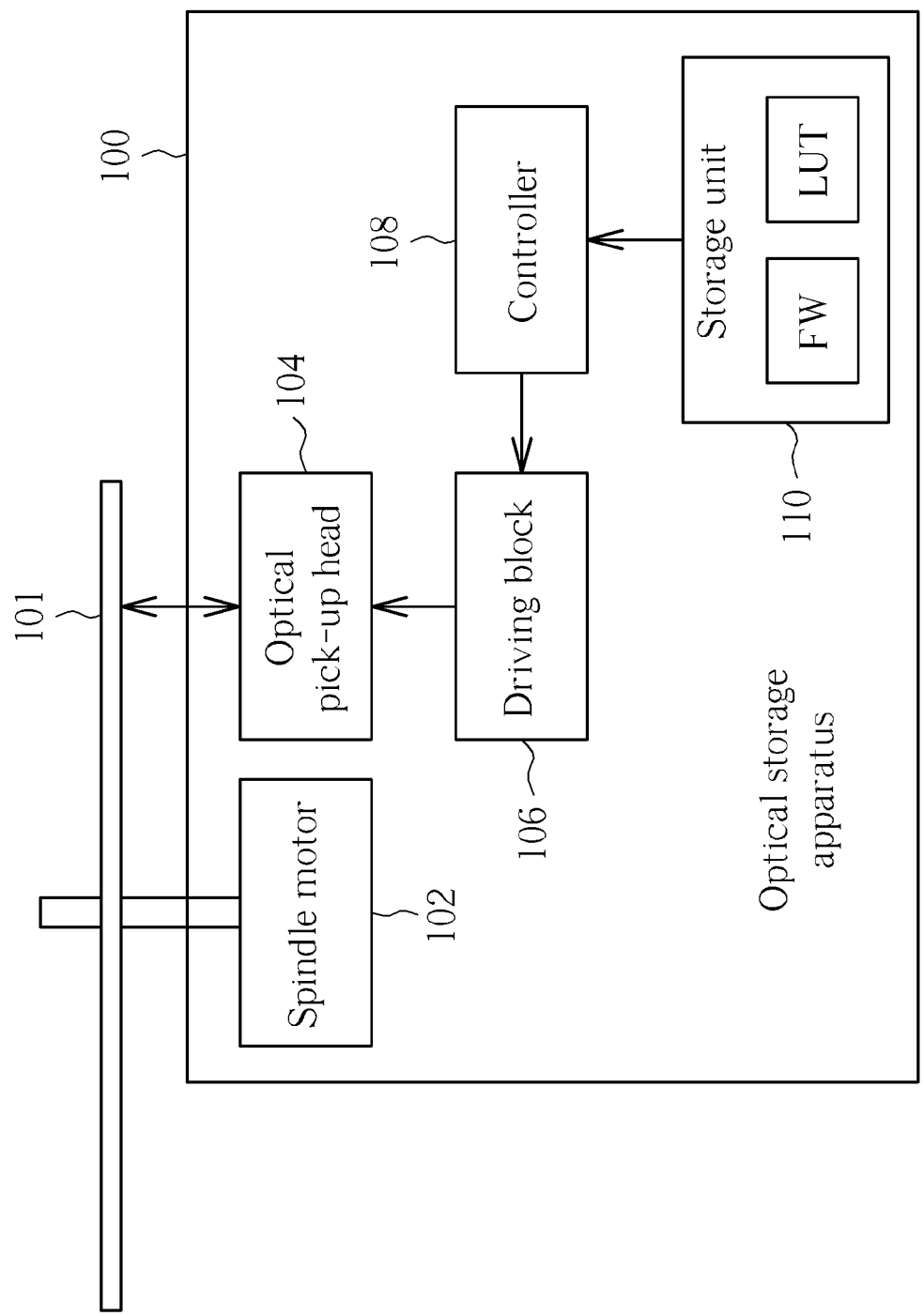
FIG. 1 is a block diagram illustrating an optical storage apparatus according to an exemplary embodiment of the present invention.

FIG. 1 is a block diagram illustrating an optical storage apparatus according to an exemplary embodiment of the present invention. The optical storage apparatus (e.g., an optical disc drive) 100 includes, but is not limited to, a spindle motor 102, an optical pick-up head 104, a driving block 106 coupled to the optical pick-up head 104, a controller 108 coupled to the driving block 106, and a storage unit 110 coupled to the controller 108. Please note that only the components pertinent to data recording are illustrated in FIG. 1 for clarity and simplicity; in other words, the optical storage apparatus 100 is allowed to have additional functional blocks incorporated therein.

The spindle motor 102 is implemented for rotating an optical storage medium (e.g., a rewritable optical disc) 101 at a desired rotational speed. The storage unit 110 is a machine readable medium which stores firmware FW including instructions executable by the controller 108 to control the driving block 106. As shown in FIG. 1, the storage unit 110 in this exemplary embodiment also has an optional look-up table LUT stored therein. The driving block 106 includes elements required for driving the optical pick-up head 104 to accomplish the data recording operation. Specifically, the controller 108 is implemented using a processor which executes the firmware FW stored in the storage unit 110 to set the current recording condition corresponding to the expected link point, and then instructs the driving block 106 to control the optical pick-up head 104 to record data onto the optical storage medium according to the current recording condition.

Figure 2:
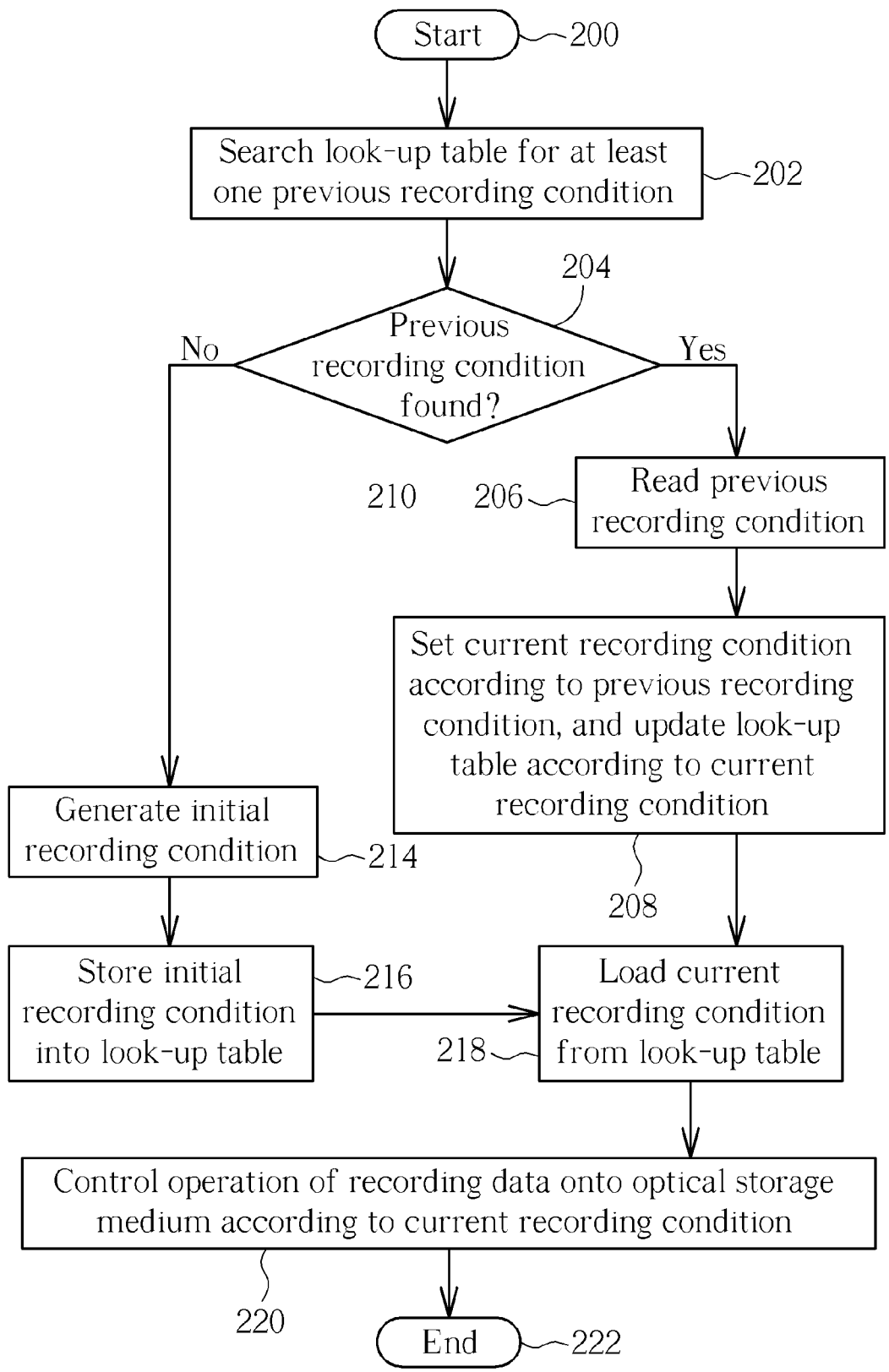
FIG. 2 is a flowchart illustrating a method of recording data onto an optical storage medium according to a first exemplary embodiment of the present invention.

FIG. 2 is a flowchart illustrating a method of recording data onto an optical storage medium according to a first exemplary embodiment of the present invention. Provided that the result is substantially the same, the steps are not required to be performed in the exact order shown in FIG. 2. In this exemplary embodiment, the method is employed by the optical storage apparatus 100 shown in FIG. 1, and the steps of the method are performed by the controller (e.g., a processor) 108 executing the instructions included in the firmware FW stored in the storage unit (e.g., a machine readable medium) 110. The exemplary method of the present invention includes following steps:

Step 200: Start.

Step 202: Before starting recording data onto an optical storage medium (e.g., a rewritable optical disc) from an expected link point on the optical storage medium, search a look-up table for at least one previous recording condition corresponding to the expected link point.

Step 204: Is the previous recording condition stored in the look-up table? If yes, go to step 206; otherwise, go to step 214.

Step 206: Read the previous recording condition from the look-up table.

Step 208: Set a current recording condition corresponding to the expected link point according to the previous recording condition, and update the look-up table according to the current recording condition. Proceed with step 218.

Step 214: Generate an initial recording condition corresponding to the expected link point.

Step 216: Store the initial recording condition into the look-up table.

Step 218: Load the current recording condition corresponding to the expected link point from the look-up table.

Step 220: Control the operation of recording the data onto the optical storage medium according to the current recording condition.

Step 222: End.

The conception of the present invention is to make a current recording condition corresponding to an expected link point (e.g., an expected recording start address on the optical storage medium 101) different from at least one previous recording condition corresponding to the same expected link point. Besides, previous recording conditions for different expected link points are preferably stored in a look-up table (e.g., the optional look-up table LUT in the storage unit 110 shown in FIG. 1). Therefore, if data are required to be recorded onto the optical storage medium 101 from an expected link point on the optical storage medium 101, the exemplary method of the present invention first searches the look-up table LUT for at least one previous recording condition corresponding to the expected link point before the data are actually recorded onto the optical storage medium 101 according to the expected link point (Step 202).

In a case where no previous recording condition corresponding to the expected link point can be found in the look-up table LUT, meaning that no data have been written onto the optical storage medium 101 from the expected link point before, any recording condition complying with the specification of the optical storage medium 101 can be employed to serve as an initial recording condition for the expected link point, and then the initial recording condition is stored into an entry of the look-up table LUT (Steps 214 and 216).

In step 204, when the previous recording condition of the expected link point can be found in the look-up table LUT, meaning that data have been written onto the optical storage medium 101 from the expected link point before, the exemplary method therefore reads the previous recording condition from the look-up table LUT for determining a current recording condition corresponding to the expected link point. In one exemplary implementation, the current recording condition corresponding to the expected link point is prevented from being identical to the previous recording condition, thereby effectively increasing the number of available DOW cycles. Specifically, the current recording condition of the expected link point is set by referring to the previous recording condition after the previous recording condition is derived from the look-up table LUT, and the look-up table LUT is updated according to the current recording condition after the current recording condition different from the previous recording condition is determined (Steps 206 and 208). After the current recording condition is stored into the look-up table LUT, the current recording condition corresponding to the expected link point can be derived from the look-up table LUT when needed, and the data will be recorded onto the optical storage medium 101 according to the current recording condition (Steps 218 and 220).

Provided that the same objective is achieved, additional step(s) can be added to the exemplary flowchart in FIG. 2. For example, when no previous recording condition of the expected link point can be found in the look-up table LUT, meaning that no data have been written onto the optical storage medium 101 from the expected link point before, an alternative embodiment checks the availability of free storage space in the look-up table LUT before executing step 214. When the look-up table LUT is not full yet, step 214 is executed. However, if no free storage space is available in the current look-up table LUT, one existing entry has to be removed from the look-up table LUT to thereby create free storage space for recording new data.

In one exemplary implementation, regarding link points with their respective recording conditions stored in entries of the look-up table LUT, a link point which is least frequently used for data recording is selected, and an entry which stores the recording condition of the selected link point is removed. By way of example, not a limitation, each entry in the look-up table LUT is assigned with an update count value which is used to record how many times the entry has been updated by a recording condition of a corresponding link point. In other words, an update count value is increased by an increment value (e.g., 1) each time the corresponding look-up table entry is updated. Therefore, by checking the update count values of all entries included in the look-up table LUT, the entry to be removed can be easily identified. Please note that using the update count values to identify a look-up table entry to be removed is for illustrative purposes only. Any means capable of identifying one entry which stores the recording condition of the least frequently used link point can be adopted.

Figure 3:
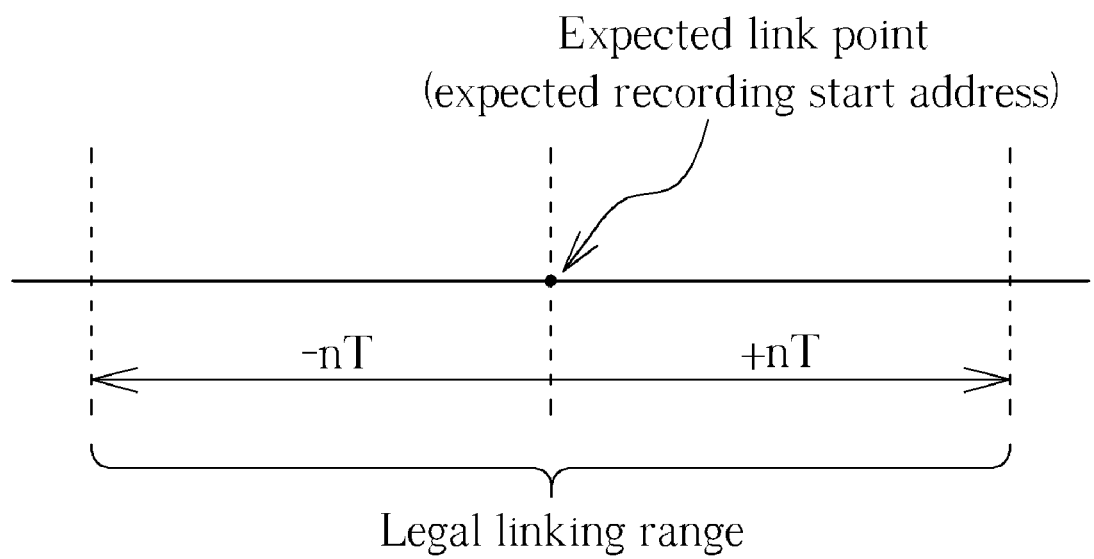
FIG. 3 is a diagram illustrating a legal linking range for an exact link point.

Regarding step 208, the generation of the current recording condition depends upon the specification of the optical storage medium 101. For example, when the optical storage medium 101 is one of a CD-RW disc, a DVD+RW disc, a DVD-RW disc, and a BD-RE disc, an exact link point (e.g., an actual recording start address) is allowed to have a shifting margin of ±nT with respect to an expected link point (e.g., an expected recording start address) according to the disc specification. A legal linking range for an exact link point is showed in FIG. 3, and the legal linking range varies with different types of optical storage medium.

Figure 4:
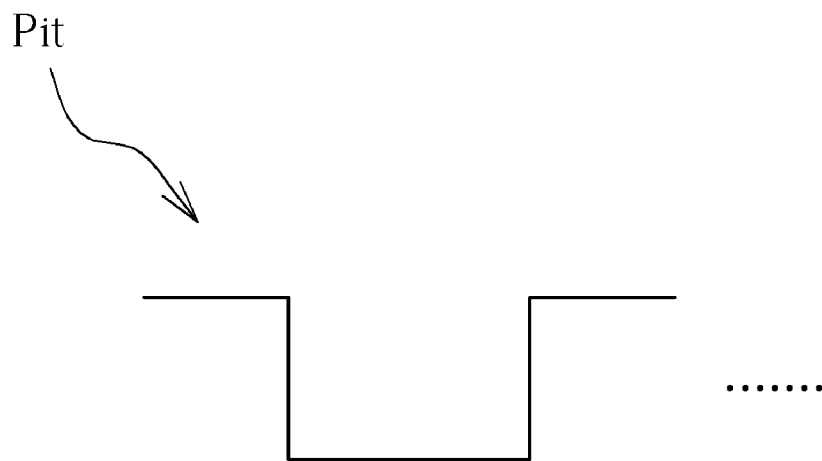
FIG. 4 is a diagram illustrating one initial modulation data pattern that is a pit and another initial modulation data pattern that is a land.
Figure 4:
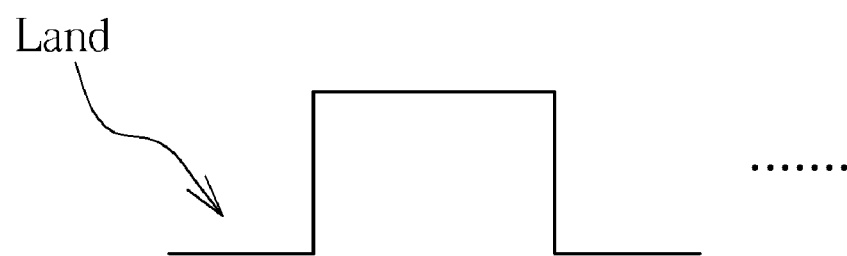

Besides, when the optical storage medium 101 is one of a CD-RW disc, a DVD+RW disc, a DVD-RW disc, and a BD-RE disc, an initial modulation data pattern, such as an initial eight-to-fourteen modulation (EFM) pattern, can be either pit or land according to the disc specification. The sub-diagram (A) of FIG. 4 shows an initial modulation data pattern that is a pit, while the sub-diagram (B) of FIG. 4 shows an initial modulation data pattern that is a land. Specifically, the signal waveform of data with an initial modulation data pattern being a pit is an inverse version of that of data with an initial modulation data pattern being a land.

When the optical storage medium 101 is a DVD-RAM disc, an exact link point (e.g., an actual recording start address) is identical to an expected link point (e.g., an expected recording start address) according to the disc specification; however, an initial modulation data pattern, such as an initial eight-to-fourteen modulation (EFM) pattern, can be either a pit or a land, as shown in FIG. 4.

In addition, in accordance with the specification of a DVD-RAM disc, the modulation data length is adjustable. As shown in FIG. 5, the modulation data lengths of certain fields are not fixed, where the modulation data length adjustment, including j and K, can be randomly set. Therefore, regarding a recording condition for recording data onto a DVD-RAM disc, it can be dynamically varied by properly setting the initial modulation data pattern (initial pit/land), and/or the value J of Gap field/Buffer field and the length K of Guard 1/Guard 2.

In view of above, the afore-mentioned current recording condition and the previous recording condition corresponding to the expected link point can be configured to be different by varying an initial modulation data pattern and/or a number of shift bits for a recording start address when the optical storage medium 101 is one of a CD-RW disc, a DVD+RW disc, a DVD-RW disc, and a BD-RE disc. Besides, the afore-mentioned current recording condition and the previous recording condition corresponding to the expected link point can be configured to be different by varying an initial modulation data pattern and/or a modulation data length adjustment when the optical storage medium 101 is a DVD-RAM disc.

Figure 6:
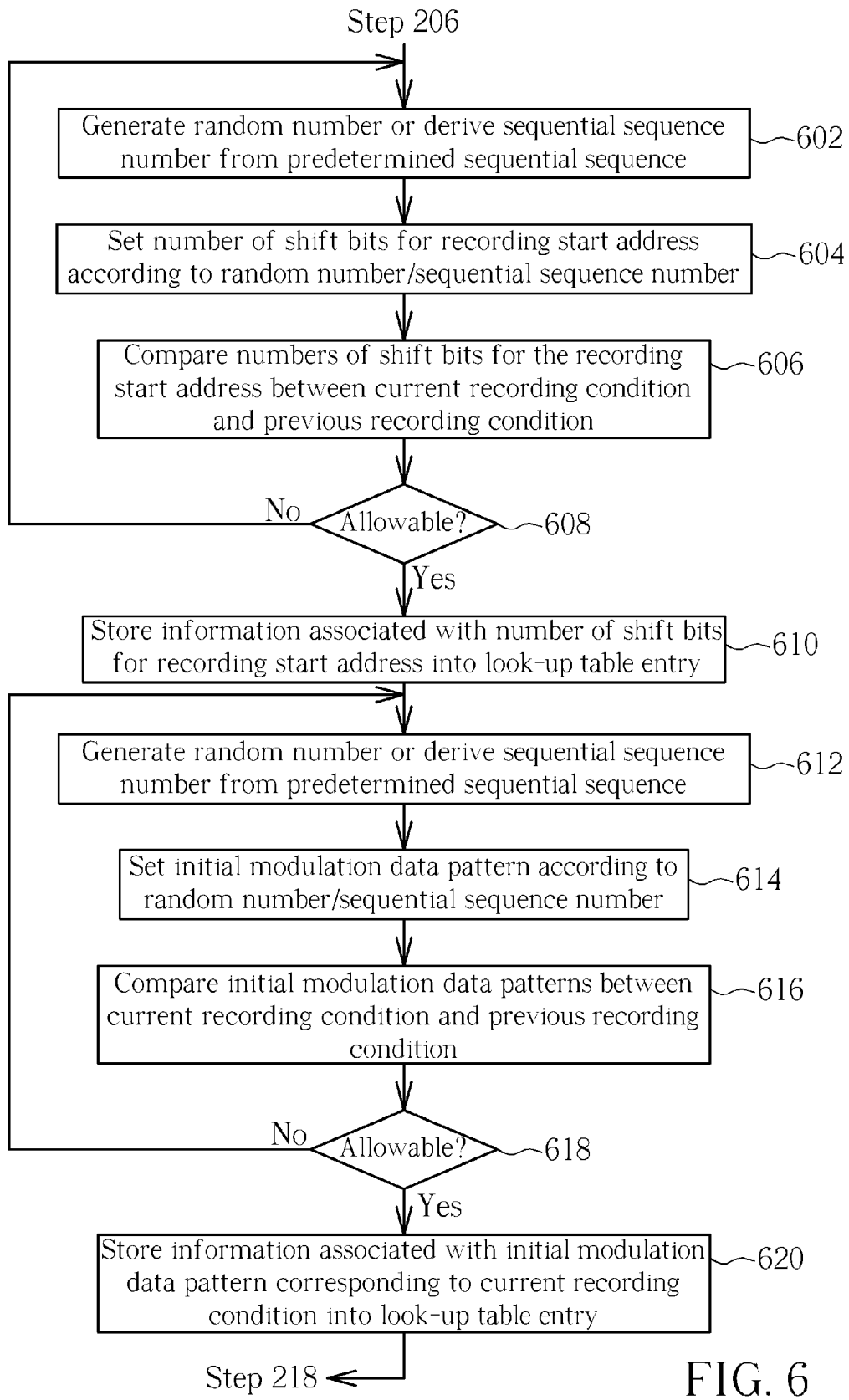
FIG. 6 is a detailed flowchart illustrating a first exemplary implementation of step 208 shown in FIG. 2.

FIG. 6 is a detailed flowchart illustrating a first exemplary implementation of step 208 shown in FIG. 2. Provided that the result is substantially the same, the steps are not required to be performed in the exact order shown in FIG. 6. The first exemplary implementation of step 208 includes following steps:

Step 602: Generate a random number for the expected link point, or derive a sequential sequence number from a predetermined sequential sequence for the expected link point.

Step 604: Set the number of shift bits for the recording start address according to the random number/sequential sequence number.

Step 606: Compare the numbers of shift bits for the recording start address between the current recording condition and the previous recording condition.

Step 608: Is the number of shift bits for the recording start address corresponding to the current recording condition allowable? If yes, go to step 610; otherwise, go to step 602.

Step 610: Store information associated with the number of shift bits for the recording start address into a look-up table entry, where the look-up table entry is used to store information associated with the current recording condition corresponding to the expected link point.

Step 612: Generate a random number for the expected link point, or derive a sequential sequence number from a predetermined sequential sequence for the expected link point.

Step 614: Set the initial modulation data pattern (e.g., an initial EFM pattern) according to the random number/sequential sequence number.

Step 616: Compare the initial modulation data patterns between the current recording condition and the previous recording condition.

Step 618: Is the initial modulation data pattern of the current recording condition allowable? If yes, go to step 620; otherwise, go to step 612.

Step 620: Store information associated with the initial modulation data pattern into the aforementioned look-up table entry.

To put it simply, setting the current recording condition (a preliminary recording condition is included) corresponding to the expected link point includes comparing the preliminary recording condition (which may include the number of shift bits for a recording start address and/or an initial modulation data pattern) with the previous recording condition of the expected link point to generate a comparison result, and determining the current recording condition according to the preliminary recording condition and the comparison result, where the preliminary recording condition is set as the current recording condition when the comparison result indicates that the preliminary recording condition is not identical to the previous recording condition. Otherwise, the preliminary recording condition is adjusted until the comparison result indicates that the preliminary current recording condition is not identical to the previous recording condition, and then the adjusted preliminary recording condition is set as the current recording condition.

By way of example, not a limitation, the preliminary recording condition is set as the current recording condition when the number of shift bits for the recording start address and the initial modulation data pattern are both found different from that of a previous recording condition Furthermore, with regard to setting the current recording condition corresponding to the expected link point, random numbers or sequential sequence numbers can be used to determine how to set the number of shift bits for the recording start address and the initial modulation data pattern. By way of example, not a limitation, one random number is mapped to a particular setting of the number of shift bits for the recording start address; similarly, one random number is mapped to a particular setting of the initial modulation data pattern. A predetermined sequential sequence is composed of a plurality of sequential sequence numbers in order. One sequential sequence number derived from a first predetermined sequential sequence is mapped to a particular setting of the number of shift bits for the recording start address. Similarly, one sequential sequence number derived from a second predetermined sequential sequence is mapped to a particular setting of the initial modulation data pattern. It should be note that the first and second predetermined sequential sequences can be the same or different, depending upon actual design requirement.

In the flowchart shown in FIG. 6, step 610 and step 620 are performed to update the look-up table LUT according to the current recording condition corresponding to the expected link point, where the current recording condition includes information associated with the number of shift bits for the recording start address and the initial modulation data pattern. Regarding the information associated with the number of shift bits for the recording start address, the recorded information may be indicative of a displacement between the exact link point (i.e., the actual recording start address) and a reference point on the optical storage medium 101, such as a wobble address (physical address) before the expected link point, a wobble address (physical address) after the expected link point, or the expected link point itself.

Moreover, the information associated with the number of shift bits for the recording start address and the initial modulation data pattern can be directly obtained by the respective setting results thereof. In an alternative design, updating the look-up table according to the current recording condition corresponding to the expected link point includes measuring an actual recording condition of the data which have been recorded onto the optical storage medium according to the current recording condition, and storing the actual recording condition corresponding to the expected link point into the look-up table. In other words, the information associated with the number of shift bits for the recording start address and the initial modulation data pattern is obtained via a measurement procedure which is performed after the data have been recorded onto the optical storage medium 101 according to the current recording condition. This also obeys the spirit of the present invention.

It should be noted that, based upon design considerations, steps 610 and 620 can be performed before data are recorded onto the optical storage medium 101 according to the current recording condition or after data have been recorded onto the optical storage medium 101 according to the current recording condition.

In above exemplary flowchart shown in FIG. 6, each of the current recording condition and the previous recording condition is defined to include information associated with an initial modulation data pattern and the number of shift bits for the recording start address. However, this is for illustrative purposes only. In one alternative design, each of the current recording condition and the previous recording condition is defined to include information associated with an initial modulation data pattern, and steps 602-610 shown in FIG. 6 can be omitted. In another alternative design, each of the current recording condition and the previous recording condition is defined to include information associated with the number of shift bits for the recording start address, and steps 612-620 shown in FIG. 6 can be omitted.

Figure 7:
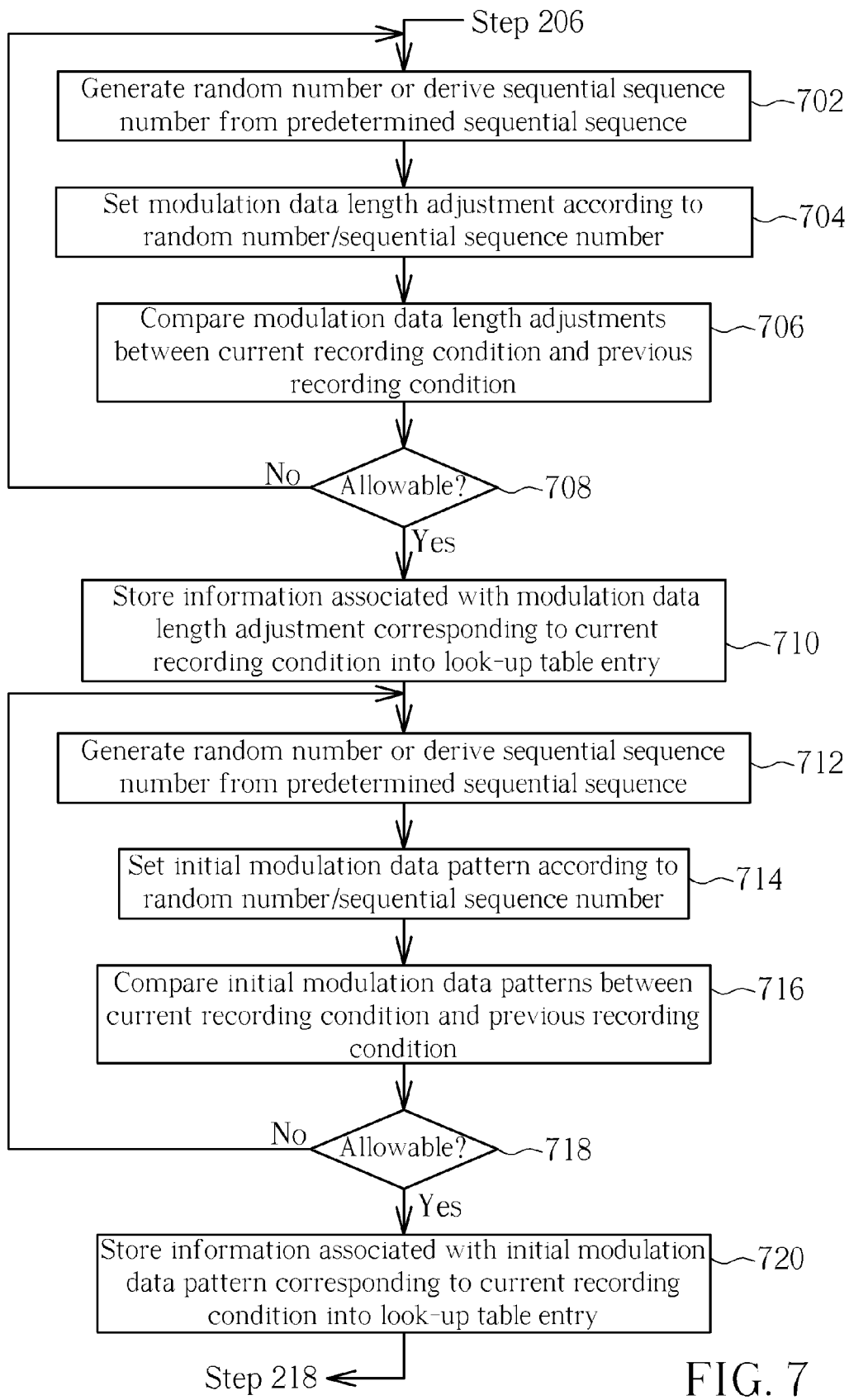
FIG. 7 is a detailed flowchart illustrating a second exemplary implementation of step 208 shown in FIG. 2.

FIG. 7 is a detailed flowchart illustrating a second exemplary implementation of step 208 shown in FIG. 2. Provided that the result is substantially the same, the steps are not required to be performed in the exact order shown in FIG. 7. The second exemplary implementation of step 208 includes following steps:

Step 702: Generate a random number for the expected link point, or derive a sequential sequence number from a predetermined sequential sequence for the expected link point.

Step 704: Set the modulation data length adjustment according to the random number/sequential sequence number.

Step 706: Compare the modulation data length adjustments between the current recording condition and the previous recording condition.

Step 708: Is the modulation data length adjustment corresponding to the current recording condition allowable? If yes, go to step 710; otherwise, go to step 702.

Step 710: Store information associated with the modulation data length adjustment corresponding to the current recording condition into a look-up table entry, where the look-up table entry is used to store information associated with the current recording condition corresponding to the expected link point.

Step 712: Generate a random number for the expected link point, or derive a sequential sequence number from a predetermined sequential sequence for the expected link point.

Step 714: Set the initial modulation data pattern (e.g., an initial EFM pattern) according to the random number/sequential sequence number.

Step 716: Compare the initial modulation data patterns between the current recording condition and the previous recording condition.

Step 718: Is the initial modulation data pattern of the current recording condition allowable? If yes, go to step 720; otherwise, go to step 712.

Step 720: Store information associated with the initial modulation data pattern corresponding to the current recording condition into the afore-mentioned look-up table entry.

By way of example, not a limitation, the second exemplary implementation of step 208 is suitable for the optical storage medium 101 being a DVD-RAM disc, whereas the first exemplary implementation of step 208 is suitable for the optical storage medium 101 being one of a CD-RW disc, a DVD+RW disc, a DVD-RM disc, and a BD-RE disc. The second exemplary implementation of step 208 as shown in FIG. 7 is similar to the first exemplary implementation of step 208 as shown in FIG. 6. The difference is that each of the current recording condition and the previous recording condition in the second exemplary implementation of step 208 includes the modulation data length adjustment and the initial modulation data pattern, rather than the number of shift bits for the recording start address and the initial modulation data pattern. Therefore, in view of above paragraphs directed to the first exemplary implementation of step 208, it is readily appreciated that the preliminary recording condition would be set as the current recording condition when the modulation data length adjustment and the initial modulation data pattern are both found different from that of the previous recording condition.

Similarly, with regard to setting the current recording condition corresponding to the expected link point, random numbers or sequential sequence numbers can be used to determine how to set the modulation data length adjustment and the initial modulation data pattern. Besides, in the flowchart shown in FIG. 7, step 710 and step 720 are performed to update the look-up table LUT according to the current recording condition corresponding to the expected link point, where the current recording condition includes information associated with the modulation data length adjustment and the initial modulation data pattern in this exemplary implementation. It should be noted that the information associated with the modulation data length adjustment and the initial modulation data pattern can also be directly obtained by the respective setting results thereof. However, in an alternative design, the information associated with the modulation data length adjustment and the initial modulation data pattern is obtained by measuring the modulation data length adjustment and the initial modulation data pattern after the data have been recorded onto the optical storage medium 101 according to the current recording condition. Moreover, it should be noted that, based upon design considerations, steps 710 and 720 can be performed before data are recorded onto the optical storage medium 101 according to the current recording condition or after data have been recorded onto the optical storage medium 101 according to the current recording condition.

In the exemplary flowchart shown in FIG. 7, each of the current recording condition and the previous recording condition is defined to include information associated with a modulation data length adjustment and an initial modulation data pattern. However, this is for illustrative purposes only. In one alternative design, each of the current recording condition and the previous recording condition is defined to include information associated with an initial modulation data pattern, and steps 702-710 shown in FIG. 7 can be omitted. In another alternative design, each of the current recording condition and the previous recording condition is defined to include information associated with the modulation data length adjustment, and steps 712-720 shown in FIG. 7 can be omitted.

In above exemplary embodiments, a preliminary recording condition which is set according to a random number/sequential sequence number is compared with one previous recording condition derived from the look-up table to see if such a preliminary recording condition is qualified as the current recording condition. However, comparing the preliminary recording condition with more than one stored previous recording condition corresponding to the same expected link point is feasible, and still obeys the spirit of the present invention. For example, a preliminary recording condition configured according to the random number/sequential sequence number is set as the desired current recording condition when the preliminary recording condition is found different from a plurality of previous recording conditions derived from the look-up table, where each of the recording conditions includes information associated with an initial modulation data pattern, a number of shift bits for a recording start address, a modulation data length adjustment, or a combination thereof.

As mentioned above, comparing one preliminary recording condition with at least one previous recording condition is to guarantee that the current recording condition derived from a qualified preliminary recording condition is different from the previous recording condition(s), thereby acquiring optimized DOW cycle improvement. However, in a case where the current recording condition is directly set by a random number/sequential sequence number for each expected link point without the afore-mentioned comparing and checking procedure applied thereto, the number of available DOW cycles may also be increased by such a recording condition setting scheme. More specifically, in one alternative design, a machine readable medium (e.g., the storage unit 110) storing instructions (e.g., the firmware FW) executable by a processor (e.g., the controller 108) to perform a method of recording data onto an optical storage medium and the related method thereof are proposed, where the method includes following steps: before starting recording data onto the optical storage medium 101 from an expected link point on the optical storage medium 101, generating a random number for the expected link point and setting a recording condition corresponding to the expected link point according to the random number, and controlling the operation of recording the data onto the optical storage medium 101 according to the recording condition.

In another alternative design, a machine readable medium (e.g., the storage unit 110) storing instructions (e.g., the firmware FW) executable by a processor (e.g., the controller 108) to perform a method of recording data onto an optical storage medium and the related method thereof are proposed, where the method includes following steps: before starting recording data onto the optical storage medium 101 from an expected link point on the optical storage medium 101, deriving a sequential sequence number from a predetermined sequential sequence for the expected link point and setting a recording condition corresponding to the expected link point according to the sequential sequence number, and controlling the operation of recording the data onto the optical storage medium 101 according to the recording condition.

Figure 8:
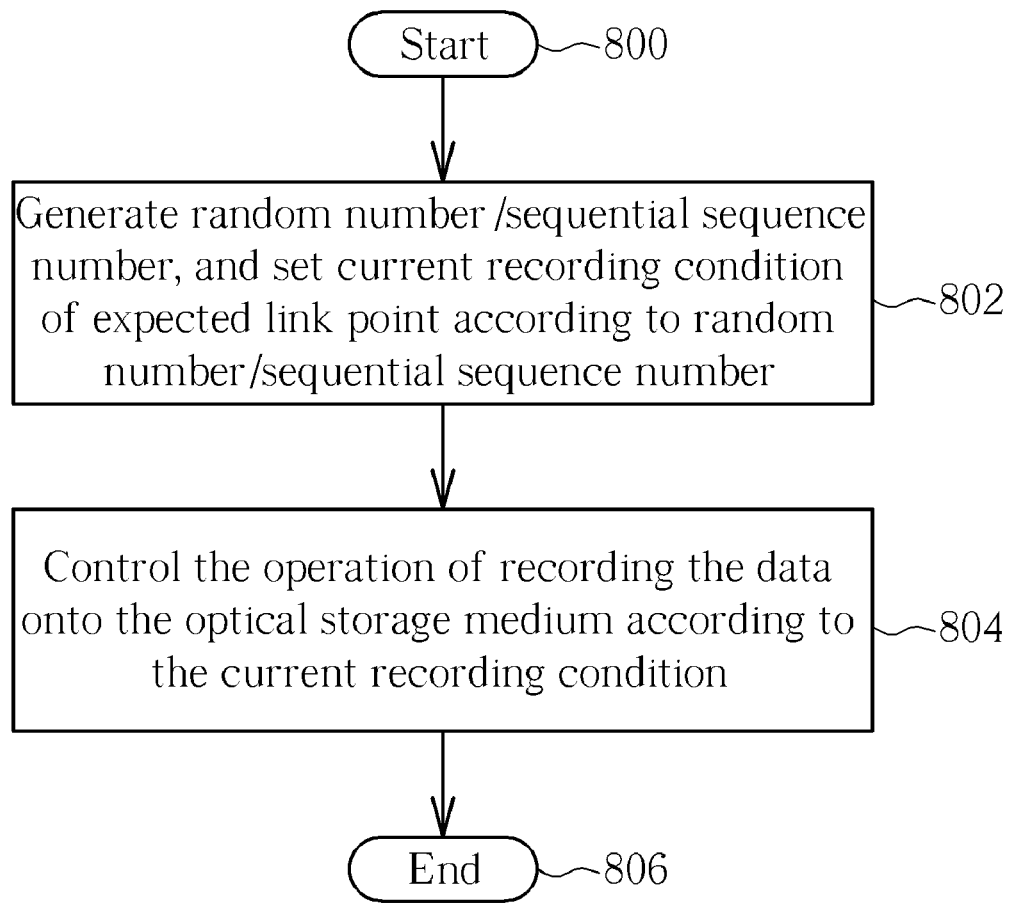
FIG. 8 is a flowchart illustrating a method of recording data onto an optical storage medium according to a second exemplary embodiment of the present invention.

Please note that using the look-up table LUT to realize the DOW cycle improvement merely serves one feasible implementation of the present invention. That is, in other exemplary embodiments of the present invention, the look-up table LUT may be omitted. FIG. 8 is a flowchart illustrating a method of recording data onto an optical storage medium according to a second exemplary embodiment of the present invention. In this exemplary embodiment, the method is employed by a modified optical storage apparatus 100 having no look-up table built in the storage unit 110, and the steps of the method are performed by the controller (e.g., a processor) 108 executing the instructions included in the firmware FW stored in the storage unit (e.g., a machine readable medium) 110. The exemplary method includes following steps:

Step 800: Start.

Step 802: Generate a random number/sequential sequence number, and set a current recording condition of an expected link point according to the random number/sequential sequence number.

Step 804: Control the operation of recording the data onto the optical storage medium according to the current recording condition.

Step 806: End.

As the current recording condition is directly set by a random number or sequential sequence number for each expected link point without referring to the previous recording condition setting, no look-up table entry for recording information of the recording condition is needed. In other words, the look-up table search operation is not involved in the recording condition setting scheme shown in FIG. 8. The number of available DOW cycles may also be increased by the recording condition setting scheme shown in FIG. 8. As a person skilled in the art can readily understand the details of setting the current recording condition according to the random number/sequential sequence number after reading paragraphs directed to aforementioned exemplary embodiments, further description is omitted here for brevity.

Those skilled in the art will readily observe that numerous modifications and alterations of the device and method may be made while retaining the teachings of the invention.

What is claimed is:

1. A method of recording data onto an optical storage medium, comprising:
   before starting recording data onto the optical storage medium from an expected link point on the optical storage medium, setting a current recording condition corresponding to the expected link point according to at least one previous recording condition corresponding to the expected link point; and
   controlling an operation of recording the data onto the optical storage medium according to the current recording condition.

2. The method of claim 1, wherein each of the current recording condition and the at least one previous recording condition includes information associated with an initial modulation data pattern, a number of shift bits for a recording start address, a modulation data length adjustment, or a combination thereof.

3. The method of claim 1, wherein the step of setting the current recording condition corresponding to the expected link point comprises:
   setting a preliminary recording condition corresponding to the expected link point; and
   comparing the preliminary recording condition with the at least one previous recording condition of the expected link point to generate a comparison result; and
   determining the current recording condition according to the preliminary recording condition and the comparison result.

4. The method of claim 3, wherein determining the current recording condition according to the preliminary recording condition and the comparison result comprises:
   setting the preliminary recording condition as the current recording condition when the comparison result indicates that the preliminary recording condition is not identical to the at least one previous recording condition.

5. The method of claim 3, wherein determining the current recording condition according to the preliminary recording condition and the comparison result comprises:
   repeatedly adjusting the preliminary recording condition until the comparison result indicates that the preliminary current recording condition is not identical to the at least one previous recording condition, and then setting the adjusted preliminary recording condition as the current recording condition.

6. The method of claim 3, wherein setting the preliminary recording condition corresponding to the expected link point comprises:
   generating a random number for the expected link point; and
   setting the preliminary recording condition according to the random number.

7. The method of claim 6, wherein the preliminary recording condition includes information associated with an initial modulation data pattern, a number of shift bits for a recording start address, a modulation data length adjustment, or a combination thereof.

8. The method of claim 3, wherein setting the preliminary recording condition corresponding to the expected link point comprises:
   deriving a sequential sequence number from a predetermined sequential sequence for the expected link point; and
   setting the preliminary recording condition according to the sequential sequence number.

9. The method of claim 8, wherein the preliminary recording condition includes information associated with an initial modulation data pattern, a number of shift bits for a recording start address, a modulation data length adjustment, or a combination thereof.

10. The method of claim 1, wherein the at least one previous recording condition of the expected link point is derived from a look-up table, and the method further comprises:
    updating the look-up table according to the current recording condition corresponding to the expected link point.

11. The method of claim 10, wherein updating the look-up table according to the current recording condition corresponding to the expected link point comprises:
    storing the current recording condition which is set according to the at least one previous recording condition into the look-up table.

12. The method of claim 10, wherein updating the look-up table according to the current recording condition corresponding to the expected link point comprises:
    measuring an actual recording condition of the data which have been recorded onto the optical storage medium according to the current recording condition; and
    storing the actual recording condition corresponding to the expected link point into the look-up table.

13. The method of claim 1, wherein the current recording condition corresponding to the expected link point is set according to the at least one previous recording condition corresponding to the expected link point when the at least one previous recording condition is available from a look-up table, and the method further comprises:
    when the at least one previous recording condition corresponding to the expected link point is not available from the look-up table:
    generating an initial recording condition corresponding to the expected link point; and
    storing the initial recording condition into the look-up table.

14. The method of claim 13, wherein storing the initial recording condition into the look-up table comprises:
    when the look-up table is full:
    removing an entry from the look-up table, where the entry stores a recording condition corresponding to a specific link point on the optical storage medium, and the specific link point is least frequently used for data recording among link points with corresponding recording conditions stored in the look-up table; and
    storing the initial recording condition into the look-up table.

15. A method of recording data onto an optical storage medium, comprising:
    before starting recording data onto the optical storage medium from an expected link point on the optical storage medium, generating a random number for the expected link point, and setting a recording condition corresponding to the expected link point according to the random number; and
    controlling an operation of recording the data onto the optical storage medium according to the recording condition.

16. The method of claim 15, wherein the recording condition includes information associated with an initial modulation data pattern, a number of shift bits for a recording start address, a modulation data length adjustment, or a combination thereof.

17. A method of recording data onto an optical storage medium, comprising:
 before starting recording data onto the optical storage medium from an expected link point on the optical storage medium, deriving a sequential sequence number from a predetermined sequential sequence for the expected link point, and setting a recording condition corresponding to the expected link point according to the sequential sequence number; and
 controlling an operation of recording the data onto the optical storage medium according to the recording condition.

18. The method of claim 17, wherein the recording condition includes information associated with an initial modulation data pattern, a number of shift bits for a recording start address, a modulation data length adjustment, or a combination thereof.

19. A non-transitory machine readable medium storing instructions executable by a processor to perform activities comprising:
 before starting recording data onto the optical storage medium from an expected link point on the optical storage medium, setting a current recording condition corresponding to the expected link point according to at least one previous recording condition corresponding to the expected link point; and
 controlling an operation of recording the data onto the optical storage medium according to the current recording condition.

20. A non-transitory machine readable medium storing instructions executable by a processor to perform activities comprising:
 before starting recording data onto the optical storage medium from an expected link point on the optical storage medium, generating a random number for the expected link point, and setting a recording condition corresponding to the expected link point according to the random number; and
 controlling an operation of recording the data onto the optical storage medium according to the recording condition.

21. A non-transitory machine readable medium storing instructions executable by a processor to perform activities comprising:
 before starting recording data onto the optical storage medium from an expected link point on the optical storage medium, deriving a sequential sequence number from a predetermined sequential sequence for the expected link point, and setting a recording condition corresponding to the expected link point according to the sequential sequence number; and
 controlling an operation of recording the data onto the optical storage medium according to the recording condition.

* * * * *